United States Patent [19]

Lindstrom

[11] Patent Number: 4,998,165
[45] Date of Patent: Mar. 5, 1991

[54] SOFTWARE INVISIBLE SELECTIVE MONOCHROME TO COLOR SIGNAL CONVERTER FOR MEDICAL DIAGNOSTIC IMAGING

[75] Inventor: Walter W. Lindstrom, Shaker Heights, Ohio

[73] Assignee: Picker International, Inc., Highland Heights, Ohio

[21] Appl. No.: 325,204

[22] Filed: Mar. 17, 1989

[51] Int. Cl.⁵ .............................................. H04N 1/46
[52] U.S. Cl. ........................................ 358/81; 358/82; 128/660.01; 128/661.09; 340/703; 364/521
[58] Field of Search ...................... 358/81, 80, 82, 110, 358/111, 112; 364/413, 521; 128/660.01, 660.04, 661.09, 661.1; 343/181; 340/701, 702, 703

[56] References Cited

U.S. PATENT DOCUMENTS

| | | | |
|---|---|---|---|
| 4,149,185 | 4/1979 | Weinger | 358/81 |
| 4,183,046 | 1/1980 | Dalke et al. | 358/81 |
| 4,613,852 | 9/1986 | Maruko | 340/703 |
| 4,761,740 | 8/1988 | Lipschutz | 358/81 |
| 4,789,831 | 12/1988 | Mayo, Jr. | 358/82 |
| 4,794,932 | 1/1989 | Baba | 358/82 |
| 4,808,989 | 2/1989 | Tabata et al. | 340/703 |
| 4,827,942 | 5/1989 | Lipschutz | 358/82 |

*Primary Examiner*—Howard W. Britton
*Assistant Examiner*—Michael H. Lee
*Attorney, Agent, or Firm*—Fay, Sharpe Beall, Fagan, Minnich & McKee

[57] ABSTRACT

A medical diagnostic imaging apparatus (A) creates an image representation which is stored in an image memory (24). A video processor (26) generates a monochrome video signal from the data stored in the image memory. A monochrome to color video signal converter (B) converts the gray scale designations of the monochrome video signal to hue scale designations of a color video signal. More specifically, the gray scale values of the monochrome signal are digitized by an analog-to-digital (32) and used as addresses for a plurality of look up tables (36r, 36g, 36b, 64r, 64g, 64b). Each set of three look up tables (30, 60, 66) is preprogrammed with appropriate transfer functions, such as the transfer functions (40, 42, 44) of FIG. 2. Each look up table puts out an appropriate intensity designation for one of the three color components of the video signal. A digital-to-analog converter (50) converts the look up table outputs to three components of an RGB or other appropriate color video signal. Switches (72) are controlled by a switch controller (74) to switch among two or more sets of look up tables during each frame of the monochrome video signal. Each seat of look up tables has different transfer functions, such as a monochrome to color transfer function and a monochrome to monochrome transfer function. In this manner, some quadrants or other regions (78a, 78b, 78c, 78d) of the video display on a video monitor (C) are in color and other quadrants are in black and white. This enables multiple diagnostic images to be displayed concurrently in quadrants of the video display in either a monochrome or color format—whichever is more appropriate to the nature of the image.

19 Claims, 3 Drawing Sheets

SOFTWARE INVISIBLE SELECTIVE MONOCHROME TO COLOR SIGNAL CONVERTER FOR MEDICAL DIAGNOSTIC IMAGING

BACKGROUND OF THE INVENTION

The present invention relates to the video processing arts. It finds particular application in conjunction with the display of images from computed tomography (CT) diagnostic scanners and will be described with particular reference thereto. However, it is to be appreciated that the invention will find further application in other areas of medical diagnostic imaging, quality assurance imaging, and other video applications, particularly those in which a wide range of gray scale differentiation is advantageous.

CT images, which have a high spatial resolution and a good signal-to-noise ratio, have traditionally been displayed on monochrome monitors. Monochrome monitors provided better resolution than color monitors whose color masks tend to cause spatial distortions. On the other hand, color monitors are most commonly used in nuclear medicine in which the spatial resolution was significantly lower than in CT. The color monitors allow the viewer more accurate quantification. The human eye can distinguish hundreds of color and hue tones but only about twenty gray scale levels.

In xenon-CT, magnetic resonance spectroscopy, magnetic resonance and CT flow imaging, and the like, a variety of different types of images are commonly produced. For some of the images, the resolution of a monochrome display is more desirable. For other images, the more accurate quantification of a color monitor would be desirable. However, the entire family of images in these studies is normally displayed on one monitor—a monochrome monitor which preserves the resolution of the highest resolution images.

Color imaging is also more expensive. CT scanners conventionally include a monochrome video processor which generates the output video signal. Changing to color would require not only a more expensive color video processor, but would also require extensive modifications to interacting software and hardware. This redesign would add tens of thousands of dollars to the cost of CT scanners. The extensive amount of rebuilding and modification of software, firmware, and hardware would make retrofitting existing CT scanners impractical.

The present invention enables a standard monochrome video signal to be displayed in monochrome, color, or a combination of monochrome and color.

SUMMARY OF THE INVENTION

In accordance with one aspect of the present invention, a method is provided for converting a monochrome video signal to a polychrome video signal. The monochrome video signal has a series of magnitude values or gray scale along each scan line. The video signal is conveyed to three channels, each of which converts the received magnitude values to output magnitude values. For an RGB color video signal, one of the channels converts the received magnitude values into red signal magnitude values, another converts them into green magnitude values, and the third channel converts them into blue magnitude values.

In accordance with a more limited aspect of the present invention, the gray scale magnitude values are digitized and the digital magnitude values are used as addresses for a look up table for each of the three channels. The look up table is preprogrammed with corresponding output magnitudes for the corresponding one of the three color components of the output color video signal.

In accordance with another aspect of the present invention, an apparatus is provided for converting monochrome video signals to color video signals. The apparatus includes an appropriate means or component for performing each of the above referenced steps.

In accordance with yet another aspect of the present invention, a switching means is provided for switching the magnitude values of the monochrome signal among a plurality of sets of three channels. Each set of three channels provides a different transformation of the magnitude values, e.g. a monochrome to color, a monochrome to monochrome, or the like.

In accordance with a yet more limited aspect of the present invention, a switch control means controls the switch a plurality of times within each frame of the video signal such that portions of the output video signal come from one of the sets of channels and other portions come from another of the sets of channels. In this way, the output signal can produce a display which is monochrome in some regions of the video monitor and polychrome in others.

One advantage of the present invention is that color video displays can be produced by existing diagnostic scanners and other monochrome video systems without replacing hardware or software of the underlying systems.

Another advantage of the present invention is that it is transparent to the software of existing systems. That is, no modifications to the software of existing diagnostic scanners or other video system signals are required.

Another advantage of the present invention is that it enables monochrome and polychrome video displays to be provided concurrently in different regions of a single video monitor.

Yet another advantage of the present invention is that the monochrome and polychrome regions may be manually or automatically varied.

Still further advantages of the present invention will become apparent to those of ordinary skill in the art upon reading and understanding the following detailed description.

BRIEF DESCRIPTION OF THE DRAWINGS

The invention may take form in various parts and arrangements of parts and in various steps and combinations of steps. The drawings are only for purposes of illustrating a preferred embodiment and are not to be construed as limiting the invention.

DETAILED DESCRIPTION OF THE PREFERRED EMBODIMENT

Figure 1A:
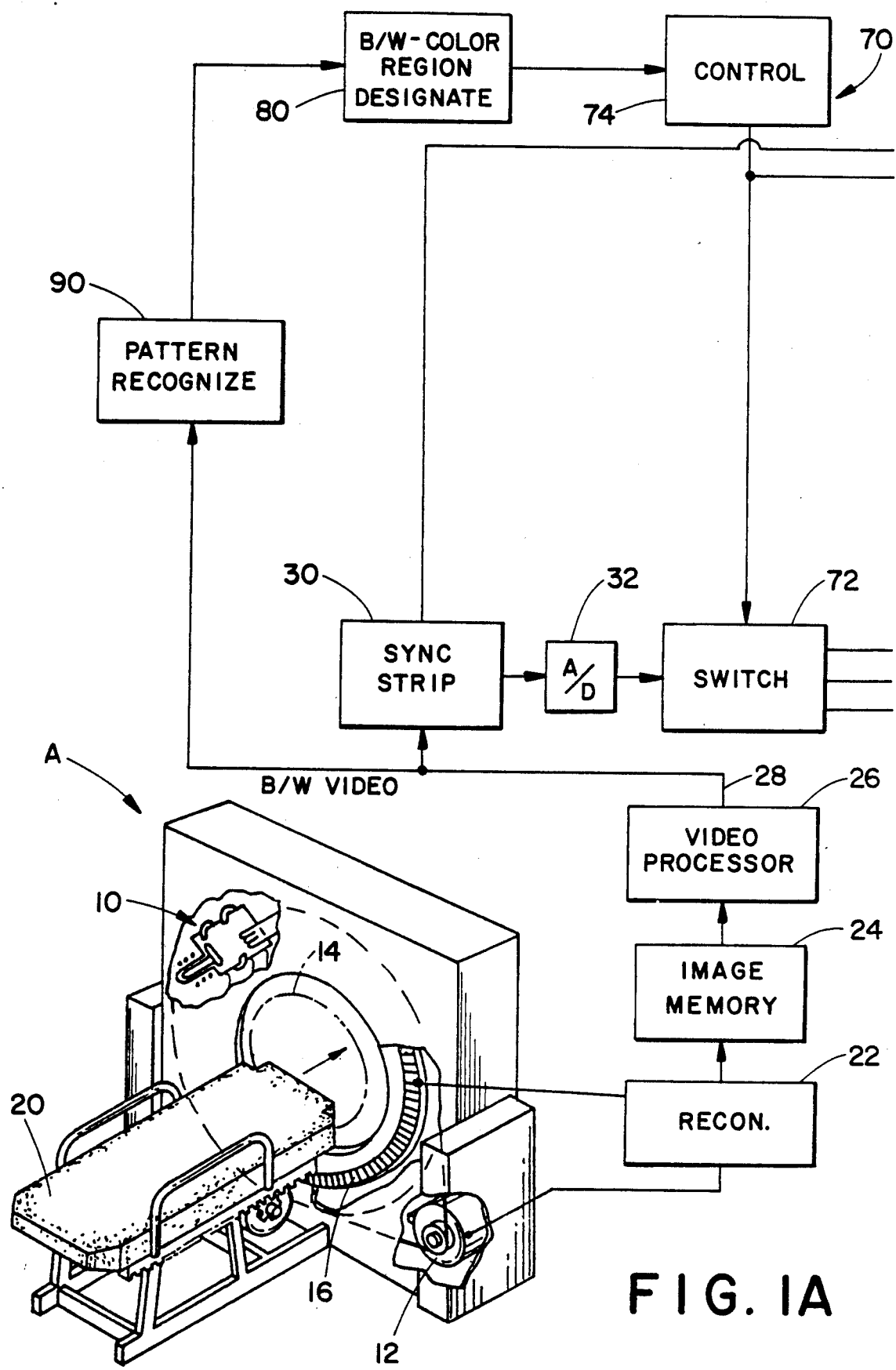
FIG. 1 illustrates a monochrome to polychrome video signal converting means in combination with a CT scanner and video display.
Figure 1B:
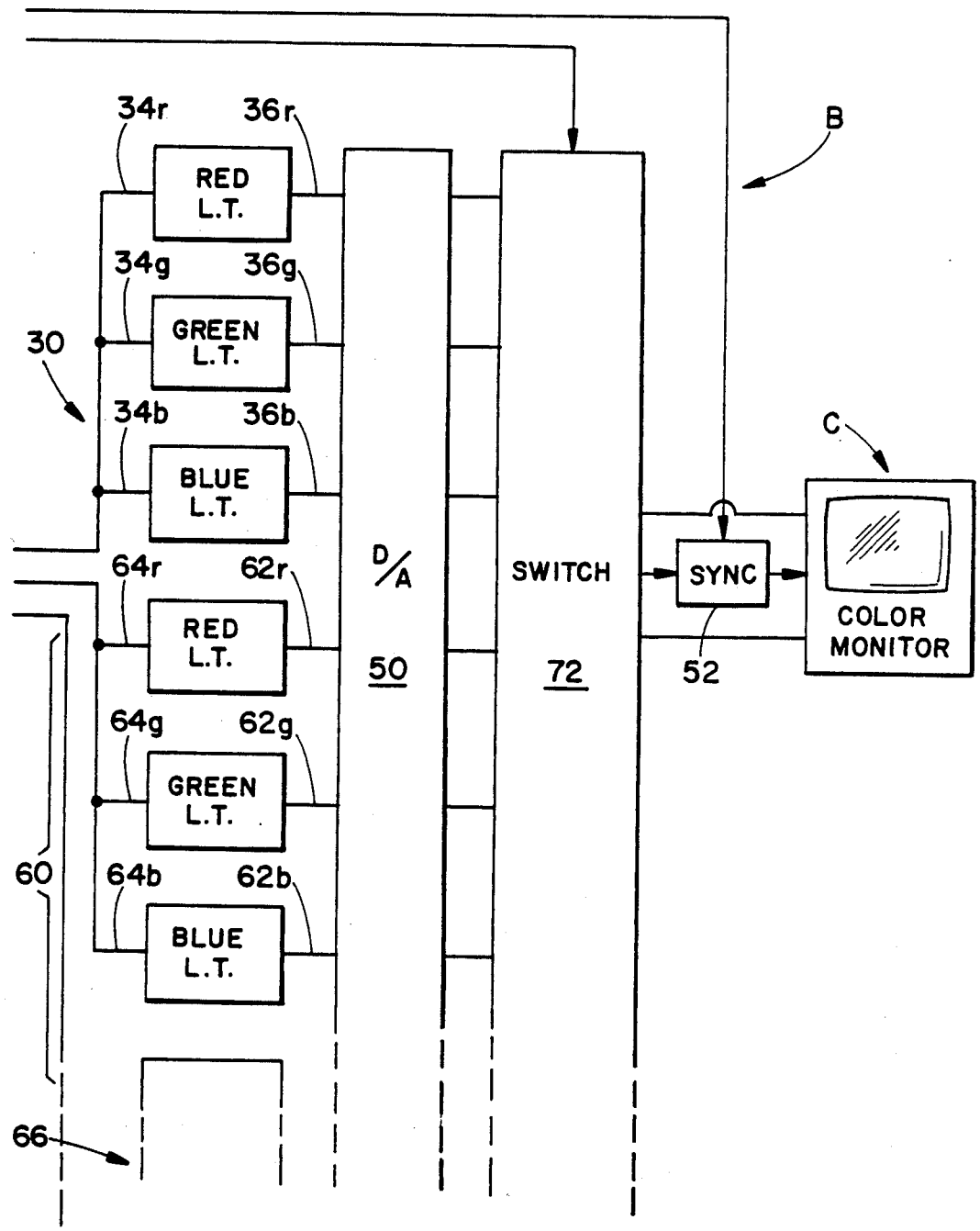

With reference to FIG. 1, a medical diagnostic imaging apparatus generates a medical diagnostic image which it outputs as a monochrome video signal. A monochrome to polychrome video signal converting means B selectively converts portions or all of the monochrome video signal to a three component polychrome or color video signal. A color monitor C receives the output polychrome video signal which it converts to a monochrome, color, or mixed monochrome and color display. It will be noted that by adjusting the relative magnitudes of the three color components of the color video signal, the display may be either monochrome or polychrome. For example, if the three color components, traditionally red, green, and blue, each have the same intensity, then the display is black and white. When the color signal components have different intensities, a color image is displayed.

In the illustrated embodiment, the medical diagnostic imager A is a CT scanner. A source of penetrating radiation 10 is rotated by a rotating means 12 around a scan circle or examination region 14. The radiation detectors 16 receive radiation which has traversed the scan circle including radiation which has traversed a subject disposed on a patient couch 20. An image reconstruction means 22 converts the intensities of radiation detected by the detectors 16 into pixel values which are stored electronically in an image memory means 24. A monochrome video processor 26 cyclically reads the pixel values in the image memory and converts them into monochrome video signal format. The monochrome video signal is outputted in a monochrome video signal output 28.

The spatial resolution, signal-to-noise ratio, reconstruction algorithms, and the like of CT scanners are sufficiently good that the pixel values or magnitudes stored in the image memory have good resolution, e.g. eight bits. Eight bits of information would enable the output monochrome video signal to have 256 available gray scale levels. However, the human eye can only distinguish about 20 or so levels of gray scale on a video monitor. Thus, intensity variations over about five bits or 32 gray scale levels are lost by the human observer. Because the human eye can distinguish many several hundred different hues, replacing the monochrome monitor with a color video monitor enables the clinician to resolve substantially all 256 intensities or gray scale levels. Because the three phosphors of a color monitor are physically offset from each other—not superimposed, the increased gray scale resolution costs spatial resolution. For example, red portions of a color image are offset from blue portions of the color image by the distance between the red and blue phosphors on the mask, introducing spatial distortion. The present invention enables portions of the video signal to have monochrome spatial resolution and other portions to have color magnitude resolution.

The monochrome to polychrome conversion means B includes a sync stripping means 30 for stripping the synchronization signals from the monochrome video signal. An analog-to-digital converter 32 repeatedly converts the analog magnitudes of the video signal to digital values, e.g. an eight bit analog-to-digital converter produces 256 digital values. The digital values are conveyed to a first set 34 of three channels. Each of the three channels converts the digital monochrome magnitude value to a magnitude for one of the three color components of the color video signal.

Figure 2:
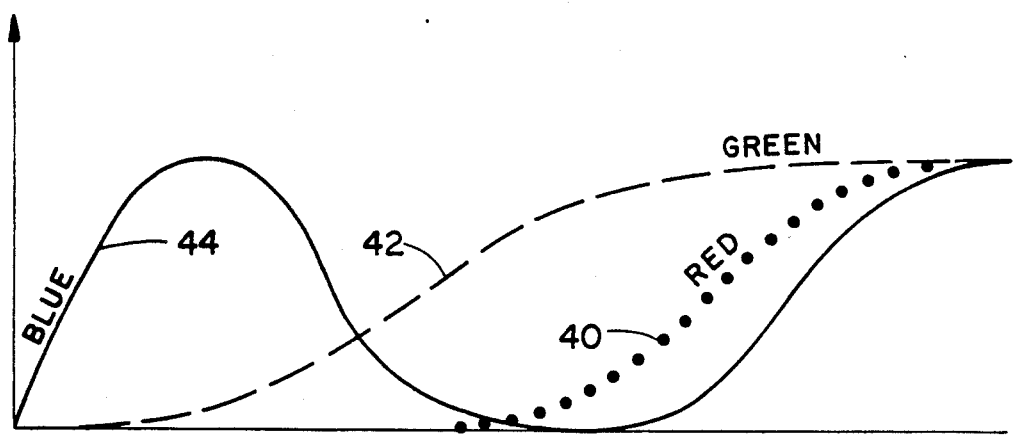
FIG. 2 is illustrative of a typical set of transforms for transforming monochrome magnitudes to the magnitudes of each of the three color components of a color video signal; and, FIG. 3 is an expanded diagram of an exemplary control means for controlling the portions of the display which are color and monochrome.

More specifically to the preferred embodiment, each of the three channels 34r, 34g, 34b implements a transfer function that converts the monochrome magnitude into a red component magnitude, a green component magnitude and a blue component magnitude, respectively. If the red, green, and blue magnitudes are balanced, the display is monochrome. They cause a hue variation with gray scale intensity, each component has a different transfer function. FIG. 2 is illustrative of an appropriate set of transfer functions for producing a polychrome or color display in which monochrome intensity variation is displayed as hue variation.

In the preferred embodiment, the channels each have a look-up table 36r, 36g, 36b, which are preloaded with the red, green, and blue transfer functions, respectively. The digital monochrome intensity value addresses all three look-up tables, concurrently, and the corresponding red, green, and blue intensity values are retrieved. More specifically to the preferred embodiment, look up table 36r is programmed in accordance with curve 40 of FIG. 2. The look up table 36g is preprogrammed to generate an output in accordance with curve 42 of FIG. 2. That is, there is substantially no green at low magnitudes and progressively higher green signal magnitude at middle magnitudes. Look up table 36b is preprogrammed in accordance with curve 44 of FIG. 2. That is, the blue intensity is highest for low magnitudes, lowest for middle magnitudes, and becomes higher again at higher monochrome magnitudes.

In this manner, low magnitude signals are displayed in blue only. As the magnitude increases, a green component is added such that signals become more yellow. As the magnitude increases, the blue component decreases and the green component increases such that the signals become more green. At higher magnitudes, the red component begins to be added such that the signals become more orange with increasing magnitude. At still higher magnitudes, where the blue curve 44 starts to increase again, the blue component makes the signal become more white. At the highest magnitude, the red, green, and blue intensities are equal, producing a white output. Other transfer functions may, of course, be selected. Further, the transfer functions may be implemented with other analog or digital circuitry. For example, the analog monochrome signal may be divided among three non-linear amplifier circuits, each of which affects one of the above discussed transfer functions.

Referring again to FIG. 1, a digital-to-analog converter 50 converts the digital output of each look up table into an analog signal, i.e. the analog red, green, and blue video signal components, respectively. A synchronization means 52 adds the appropriate synchronization signals to one of the three color signal components, conventionally, the green component. The three analog color signal components with synchronization information comprise a standard color video signal which is conveyed to the color video monitor C.

The preferred embodiment also produces a monochrome display in which a gray or other monochrome scale varies rather than hue. In the monochrome mode, the digital monochrome magnitude signals are conveyed to a second set 60 of three color component channels 62r, 62g, 62b. Each channel converts the monochrome magnitude to balanced magnitudes of the red, green, and blue color signal components such that a resultant gray display varies in intensity while holding a constant white hue. In a preferred embodiment, the second set of channels includes three look up tables 64r, 64g, 64b. Each look up table is preprogrammed to produce output magnitudes for each of the three color channels such that the color signals balance to produce a white or gray output. The magnitude of the output is selected to vary with the magnitude of the digital monochrome magnitude input. If the video monitor is perfectly linear among the three color channels over all magnitudes, the look up tables could be eliminated and the digital-to-analog converter 50 could directly convert each digital monochrome magnitude back to corresponding color component magnitudes. However, conventionally, the phosphors are such that an adjustment in relative magnitudes of the three color components is required in order to maintain true black and white. The second look up table set is programmed to provide the appropriate phosphor non-linearity correction. In this manner, all three associated color phosphors of each pixel of the video monitor are caused to glow with a substantially equal intensity, thus appearing as a white or gray dot.

Other monochrome embodiments may also be selected. For example, a green and black monochrome display could be provided. The three channels could be selected such that the green channel values vary with monochrome magnitude and the red and blue channels are held to zero. In this manner, the pixels of the video display are smaller dots of a single color phosphor. Alternately, other balanced combinations of two dots or unbalanced combinations of two or three of the three color components may be selected. For example, the look up tables may be preprogrammed to produce a black and amber display, the intensity of the amber varying with the monochrome magnitude. Additional channels 66, etc. may also be provided so that a plurality of color or monochrome transfer functions may be selected.

A transfer function selecting means 70 includes a switching means 72 for selecting one set of channels. In the illustrated embodiment, the switching means is disposed between the analog-to-digital converter 32 and the sets of look up tables such that the digital signals are directed to only one set of look up tables. Alternately, the digital signals may be sent to all of the look up tables and the switch means may select which set of outputs is conveyed downstream to the video monitor. As yet another alternative, the switching means may include switches at both ends, such that the digital magnitude signals are only conveyed to a single set of look up tables and the downstream switching means assures that stray signals from the non-addressed look up tables are not incorporated into the color video signal. A control means 74 controls the switching means within each video signal field such that selected regions of the display are displayed in monochrome and other regions are displayed in color.

Figure 3:
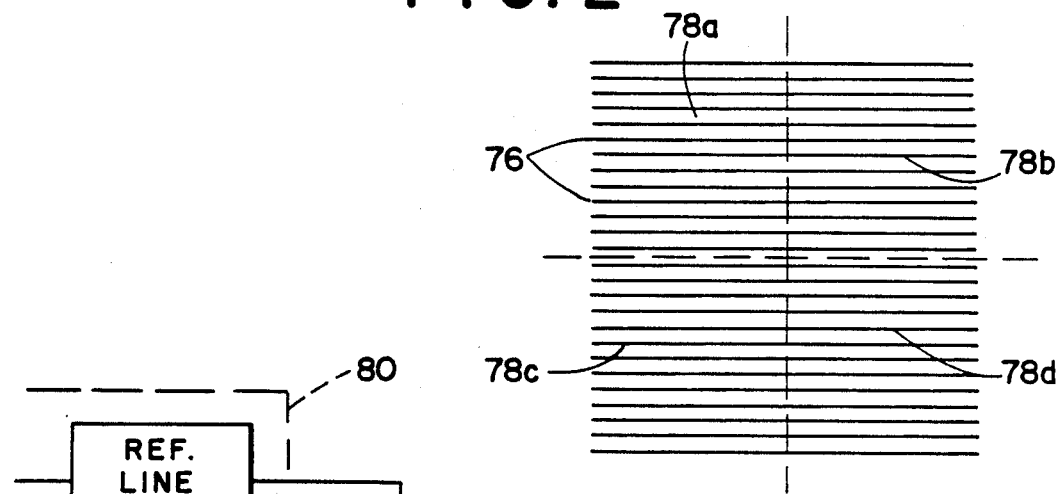

With reference to FIG. 3, the video display is commonly made up of a plurality of scan lines 76. In many medical diagnostic applications, the display is divided into four quadrants 78a, 78b, 78c, 78d such that four images can be displayed concurrently. Of course, the display may be divided into other numbers of regions. For the embodiment in which the display is divided into quadrants, the control means 74 controls the switch means 72 such that some selected quadrant(s) display in color and other selected quadrants display in monochrome.

A color/monochrome region designating means 80 designates which quadrants or display regions are to be displayed with each transfer function, e.g. which are in color and which are in black and white. More specifically, the quadrant or region designating means 80 designates which portions of each video scan line and which lines of each field or frame correspond to a selected position of the switching means. By way of example, a first quadrant 78a is displayed in monochrome, a second quadrant 78b and a third quadrant 78c are displayed in color and a fourth quadrant 78d is displayed in monochrome. The control means 74 controls the switch means 72 such that the monochrome channels 60 are selected during the first half of the first half of the scan lines and during the last half of the last half of the scan lines. During the last half of the first half of the scan lines and the first half of the last half of the scan lines, the control means changes the mode of the switching means such that the first channel set 34 is active.

Which quadrants are in color and which are in black and white may be selected and set manually by the operator. Alternately, certain types of images may automatically be displayed in color and other types may automatically be displayed in monochrome. To this end, a pattern recognition means 90 is provided for recognizing a preselected characteristic of the video signal within each quadrant or region. For example, if each type of image is labelled or marked with selected letters or numbers, the pattern recognition means recognizes a key letter(s) or number(s) from each label. In response to recognizing the letters or numbers, the pattern recognition means sets the quadrant designating means 80 appropriately. Alternately, the recognition means may recognize a characteristic of the various types of images. As yet another alternative, the monochrome video signal may be modified to add a marker or designation of which quadrants or regions are to be in color and which are to be monochrome. This designation might be in a preselected portion of each frame or field. Because video monitors commonly overscan such that the first and last few scan lines are off the edge of the video monitor screen, communicating information in this area would normally not degrade from the visible image on the video monitor. As yet another alternative, when the image is first brought up, the first field of the video signal may be dedicated to programming instructions for the pattern recognition. Because each field typically carries a very large amount of information, detailed programming instructions may be provided. Because each field is on the screen for only a 60th of a second, a single field of programming instructions flashes by too fast for the human observer to even notice.

Figure 4:
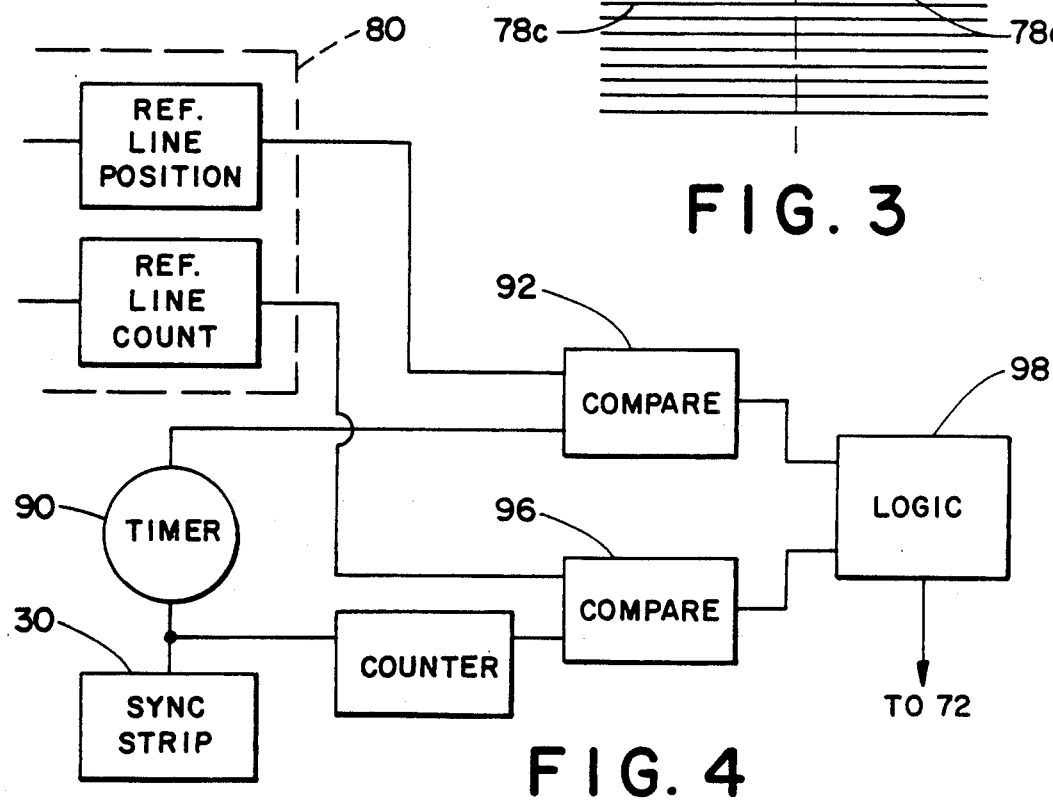

With reference to FIG. 4, an exemplary control means is illustrated. The control means includes a clock or timing means 90 which is triggered by the sync stripping means 30 to time or otherwise determine the position across each scan line. A first comparing means 92 compares the current scan line position from the clock or timing means 90 with the position of a quadrant or region interface reference value in the designation means at which the monitor is to change from monochrome to color. A line counting means 94 is controlled by the synchronization stripper 30 to count the scan line within the frame or field. A comparing means 96 compares the current line count with a reference line count value from the designating means 80. The comparing means 92, 96 are connected with a logic means 98 which determines the state of the switching means. If the control means only selects between two states, monochrome and one color state or mode, then the logic means 98 may be as simple as an AND gate.

The invention has been described with reference to the preferred embodiments. Obviously, modifications and alterations will occur to others upon reading and understanding the preceding specification. It is intended that the invention be construed as including all such alterations and modifications insofar as they come within the scope of the appended claims or the equivalents thereof.

Having thus described the preferred embodiment, the invention is now claimed to be:

1. An apparatus for converting an analog monochrome video signal to a color video signal, the apparatus comprising:
   a means for receiving the analog monochrome video signal from a monochrome video processor;
   a means for separating at least sync and magnitude components of the monochrome video signal;
   a means for conveying the separated magnitude components of the monochrome video signal to three channels, each channel converting the monochrome signal magnitudes to magnitudes of one of three color component signals of the color signal;
   a means for combining the sync component with at least one of the three color component signals;
   an output means for outputting the sync and three color signal components.

2. The apparatus as set forth in claim 1 further including an analog-to-digital converter for digitizing the monochrome signal magnitudes to digital monochrome values and wherein each channel includes a look up table which is addressed by the digital monochrome values to retrieve a corresponding color component magnitude for a respective one of the color component signals corresponding to the digital monochrome magnitude value.

3. The apparatus as set forth in claim 2 further including a switch means for selecting one of a plurality of sets of look up tables to convert the digital monochrome values to the color signal magnitudes, whereby one of a plurality of transforms between the monochrome magnitudes and color hues may be selected.

4. The apparatus as set forth in claim 3 further including a control means for controlling the switch means for selecting among the sets of look up tables.

5. An apparatus for converting a monochrome video signal to a color video signal, the apparatus comprising:
   a means for conveying magnitude components of the monochrome video signal to a first set of three channels and at least one additional set of three channels, each channel converting the monochrome signal magnitudes to magnitudes of one of three color component signals of the color video signal;
   a switch means for selecting among the sets of channels;
   an output means for outputting the three color component signals.

6. The apparatus as set forth in claim 5 further including a control means for selectively controlling the switch means within each video field to select among the sets of channels.

7. The apparatus as set forth in claim 6 wherein the monochrome video signal includes a plurality of scan lines and wherein the control means includes a first comparing means for comparing position along each scan line with at least one selected reference position and a second comparing means for comparing a scan line with at least one selected scan line number, and a logic means for controlling the switching means in accordance with the first and second comparing means such that the switching means selectively changes states with regions of a video signal field.

8. An apparatus for converting a monochrome video signal that includes a number of scan lines to a polychrome video signal, the apparatus comprising:
   a switching means for switching magnitude components of the monochrome video signal to one of at least two sets of channels, each channel converting the monochrome signal magnitudes to magnitudes of a color component of the polychrome video signal;
   a first comparing means for comparing position along each scan line with at least one selected reference position;
   a second comparing means for comparing a scan line with at least one selected scan line number;
   a logic means for controlling the switching means in accordance with the first and second comparing means in accordance with the first and second comparing means such that the switching means selectively changes states with regions of a video signal field;
   a pattern recognition means for recognizing a preselected segment of a monochrome video signal, the recognition means being operatively connected with the first and second comparing means to set the reference position and scan line number in accordance with the recognized segment from the monochrome video signal;
   an output means for outputting the polychrome video signal.

9. A medical diagnostic imaging system comprising:
   a medical diagnostic scanner including a monochrome video processor for non-invasively examining a patient and producing a complete analog monochrome video signal indicative thereof, the monochrome video signal including a plurality of frames of scan lines, each frame carrying sync information and each scan line carrying a plurality of analog magnitude values, which magnitude values are indicative of gray scale when displayed on a monochrome monitor;
   a monochrome to color converting means operatively connected to the scanner for selectively converting the gray scale magnitude values to color magnitude values for each component of a color video signal;
   a color video monitor operatively connected with the monochrome to color converting means for converting the sync information from the scanner and the color magnitude values into a man-readable display of the color video signal.

10. The system as set forth in claim 9 wherein the monochrome to color converting means includes a switching means for selecting among a plurality of monochrome to color transfer functions within each frame of the monochrome video signal.

11. A medical diagnostic imaging system comprising:
    a medical diagnostic scanner for non-invasively examining a patient and producing a monochrome video signal indicative thereof, the monochrome video signal including a plurality of scan lines, each scan line carrying a plurality of monochrome magnitude values, which magnitude values are indicative of gray scale when displayed on a video monitor;

a monochrome to color converting means operatively connected to the scanner for converting the monochrome video signal to components of a color video signal, the monochrome to color converting means including:

a plurality of sets of look up tables, each set of look up tables being preprogrammed with a selected monochrome to color transfer function such that the monochrome magnitude values address the look up tables and the look up tables retrieve corresponding magnitudes for each of the color video signal components, a switching means for selecting among the plurality of sets of look up tables;

a color video monitor operatively connected with the monochrome to color converting means for providing a man-readable display of the color video signal.

12. The system as set forth in claim 11 further including:

a analog-to-digital converter for digitizing the monochrome magnitude values such that digital monochrome magnitude values address the look up tables;

a digital-to-analog converter means for converting digital outputs of the look up tables to analog signals.

13. A medical diagnostic imaging system comprising:

a medical diagnostic scanner for non-invasively examining a patient and producing a monochrome video signal indicative thereof, the monochrome video signal including a plurality of scan lines, each scan line carrying a plurality of analog magnitude values, which magnitude values are indicative of gray scale when displayed on a video monitor;

a monochrome to color converting means operatively connected to the scanner for converting the monochrome video signal to components of a color video signal such that each magnitude value of the monochrome video signal is converted to color magnitude values of color video signal components, the monochrome to color converting means including:

a switching means for selecting among a plurality of monochrome to color transfer functions within each frame of the monochrome video signal, a first comparing means for comparing a position along each scan line with a scan line position reference value, a second comparing means for comparing a scan line number with a selected scan line count number, a logic means for controlling the switching means in accordance with the comparisons of the first and second comparing means;

a color video monitor operatively connected with the monochrome to color converting means for providing a man-readable display of the color video signal.

14. The system as set forth in claim 13 further including a recognizing means for recognizing a preselected characteristic of the monochrome video signal and providing preselected scan position and scan line count reference values in response to the recognition of the preselected characteristic.

15. A method of converting gray scale video images into hue scale color video signals, the method comprising:

receiving an analog monochrome video signal including gray scale and sync information components;

separating the gray scale and sync information components of the analog video signal;

digitizing the gray scale component;

operating on the gray scale component with a preselected transfer function to create each of three digital components of the color video signal;

converting the three digital components to three analog components of the color video signal;

combining the sync information with one of the three analog color video signal components.

16. The method as set forth in claim 15 further including digitizing the monochrome video signal to create digital values and wherein the step of operating on the monochrome video signal portions includes utilizing the digital values as addresses to look up tables which are preprogrammed in accordance with the transfer functions.

17. The method as set forth in claim 15 further including selectively changing the transfer functions.

18. A method of converting gray scale video images into hue scale color video signal, the method comprising:

receiving a monochrome video signal the monochrome video signal carrying common image representation data in a multiplicity of frames;

operating on at least a portion of the video signal with a first preselected transfer function to create components of the color video signal;

changing the transfer functions at least once at generally the same point within each subsequent frame of the monochrome video signal such that the resultant display has at least two regions, each of which has different transfer functions.

19. The method as set forth in claim 18 further including cyclically reading values from a digital image memory and converting the cyclically read digital values into the monochrome video signal.

* * * * *